US012049991B1

(12) United States Patent
Park et al.

(10) Patent No.: US 12,049,991 B1
(45) Date of Patent: Jul. 30, 2024

(54) LIGHT MEMBER HAVING A LIGHT MANIPULATING ELEMENT INCLUDING TWO LIGHT MANIPULATING SURFACES

(71) Applicant: GM Global Technology Operations LLC, Detroit, MI (US)

(72) Inventors: Jonglee Park, Novi, MI (US); Thomas S. Prevost, W Bloomfield, MI (US); Jodi Mary Jean Allen, Lake Orion, MI (US); Helgert Elezi, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/183,480

(22) Filed: Mar. 14, 2023

(51) Int. Cl.

| | |
|---|---|
| ***F21S 41/151*** | (2018.01) |
| ***F21S 41/20*** | (2018.01) |
| ***F21S 41/33*** | (2018.01) |

(52) U.S. Cl.
CPC ............. *F21S 41/33* (2018.01); *F21S 41/151* (2018.01); *F21S 41/285* (2018.01)

(58) Field of Classification Search
CPC ........ F21S 41/151; F21S 41/285; F21S 41/33; F21S 41/24; F21S 43/251; F21S 43/315; F21S 43/40; F21S 43/249; F21S 43/14; F21S 41/143; F21S 41/147; F21S 41/141; F21S 41/162; F21S 41/17; F21S 41/675; F21S 41/323; G02B 5/0816; G02B 5/0825; G02B 5/085; G02B 5/0858; G02B 5/0875; G02B 5/045; G02B 26/0825; G02B 26/0875; G02B 26/0883; G02B 26/0891; G02B 19/0028; G02B 6/0016; G02B 6/0018; G02B 6/0038; G02B 6/0036; G02B 19/0066; F21V 5/005; F21V 11/00; B60Q 1/2607; B60Q 2400/20; F21W 2107/10
See application file for complete search history.

(56) References Cited

U.S. PATENT DOCUMENTS

| | | | | | |
|---|---|---|---|---|---|
| 1,457,630 | A * | 6/1923 | Lewis | F21S 41/365 362/290 | |
| 3,079,529 | A * | 2/1963 | Novinger | B60Q 1/0023 250/214 D | |
| 4,480,291 | A * | 10/1984 | Dranginis | B60Q 1/0035 362/342 | |
| 5,467,501 | A * | 11/1995 | Sepke | A47L 9/2857 362/91 | |

(Continued)

FOREIGN PATENT DOCUMENTS

CN 104903148 A * 9/2015 ........... B60Q 1/0058

OTHER PUBLICATIONS

Search English translation of CN 104903148 A (Year: 2015).*

*Primary Examiner* — Omar Rojas Cadima
(74) *Attorney, Agent, or Firm* — CANTOR COLBURN LLP

(57) ABSTRACT

A light member includes a housing having an outer surface and an inner surface, a portion of the outer surface includes a lens. A light source is mounted in the housing. The light source is directed toward the lens. A plurality of light manipulating elements is arranged in the housing between the light source and the lens. Each of the plurality of light manipulating elements includes a body having a first side surface and a second side surface. Each of the first side surface and the second side surface is a light manipulating surface.

18 Claims, 5 Drawing Sheets

(56) References Cited

U.S. PATENT DOCUMENTS

| | | | | |
|---|---|---|---|---|
| 6,244,728 | B1 * | 6/2001 | Cote | F21V 5/04<br>362/249.11 |
| 7,280,288 | B2 * | 10/2007 | Loh | G02B 3/00<br>257/E33.073 |

* cited by examiner

LIGHT MEMBER HAVING A LIGHT MANIPULATING ELEMENT INCLUDING TWO LIGHT MANIPULATING SURFACES

INTRODUCTION

The subject disclosure relates to the art of lighting and, more particularly to a light member having a light manipulating element including two light manipulating surfaces that may be used in a vehicle.

Vehicles include forward facing or head lights that illuminate road surfaces at night. Vehicles also include rearward facing or tail lights that provide a visual to other drivers regarding the presence of the vehicle. The tail lights may also include a function that warns other drivers that brakes are being applied. Typically, a vehicle light includes a reflector having a parabolic shape that directs light from a light source through a lens. The light source may take the form of an incandescent bulb. Due to various factors, light passing from the light source through the lens experiences losses in lighting efficacy.

Modern vehicle lights incorporate one or more light emitting diodes (LEDs) as the source of light. Light emanating from the LED's passes through a collimator and through the lens. Given the proximity of the LED and collimator elements optical interferences occur that may reduce optical performance. Accordingly, it is desirable to provide a system that may reduce the occurrence of optical interferences between light passing from an LED, through a collimator, and through a lens in order to improve optical performance.

SUMMARY

A light member, in accordance with a non-limiting example, includes a housing having an outer surface and an inner surface, a portion of the outer surface includes a lens. A light source is mounted in the housing. The light source is directed toward the lens. A plurality of light manipulating elements is arranged in the housing between the light source and the lens. Each of the plurality of light manipulating elements includes a body having a first side surface and a second side surface. Each of the first side surface and the second side surface is a light manipulating surface.

In addition to one or more of the features described herein the first side surface includes a first reflectance and extends at a first angle relative to the light source and the second side surface includes a second reflectance and extends at a second angle relative to the light source, the first angle being arranged to direct light from the light source through the lens.

In addition to one or more of the features described herein the second angle is arranged to direct light rays from the light source toward the first side surface of an adjacent one of the plurality of light manipulating elements.

In addition to one or more of the features described herein the first reflectance is greater than the second reflectance.

In addition to one or more of the features described herein at least one of the light manipulating surface includes a plurality of refractive elements.

In addition to one or more of the features described herein the body is formed from a clear material.

In addition to one or more of the features described herein a reflective element is mounted to the first side surface, the reflective element establishing the first reflectance.

In addition to one or more of the features described herein comprising another reflective element extending through the body between the first side surface and the second side surface.

In addition to one or more of the features described herein another reflective element is mounted to the second side surface, the another reflective element including a pattern of reflective sections.

In addition to one or more of the features described herein the light source includes a plurality of light emitting diodes (LED's).

A vehicle, in accordance with a non-limiting example, includes a vehicle body defining a passenger compartment. The vehicle body has a forwardly facing surface and a rearwardly facing surface. A light member is mounted to one of the forwardly facing surface and the rearwardly facing surface. The light member including a housing having an outer surface and an inner surface. A portion of the outer surface includes a lens. A light source is mounted in the housing. The light source is directed toward the lens. A plurality of light manipulating elements is arranged in the housing between the light source and the lens. Each of the plurality of light manipulating elements includes a body having a first side surface, and a second side surface. Each of the first side surface and the second side surface is a light manipulating surface.

In addition to one or more of the features described herein the first side surface includes a first reflectance and extends at a first angle relative to the light source and the second side surface includes a second reflectance and extends at a second angle relative to the light source, the first angle being arranged to direct light from the light source through the lens.

In addition to one or more of the features described herein the second angle is arranged to direct light rays from the light source toward the first side surface of an adjacent one of the plurality of light manipulating elements.

In addition to one or more of the features described herein the first reflectance is greater than the second reflectance.

In addition to one or more of the features described herein at least one of the light manipulating surface includes a plurality of refractive elements.

In addition to one or more of the features described herein the body is formed from a clear material.

In addition to one or more of the features described herein a reflective element is mounted to the first side surface, the reflective element establishing the first reflectance.

In addition to one or more of the features described herein another reflective element extending through the body between the first side surface and the second side surface.

In addition to one or more of the features described herein another reflective element is mounted to the second side surface, the another reflective element including a pattern of reflective sections.

In addition to one or more of the features described herein the light source includes a plurality of light emitting diodes (LED's).

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
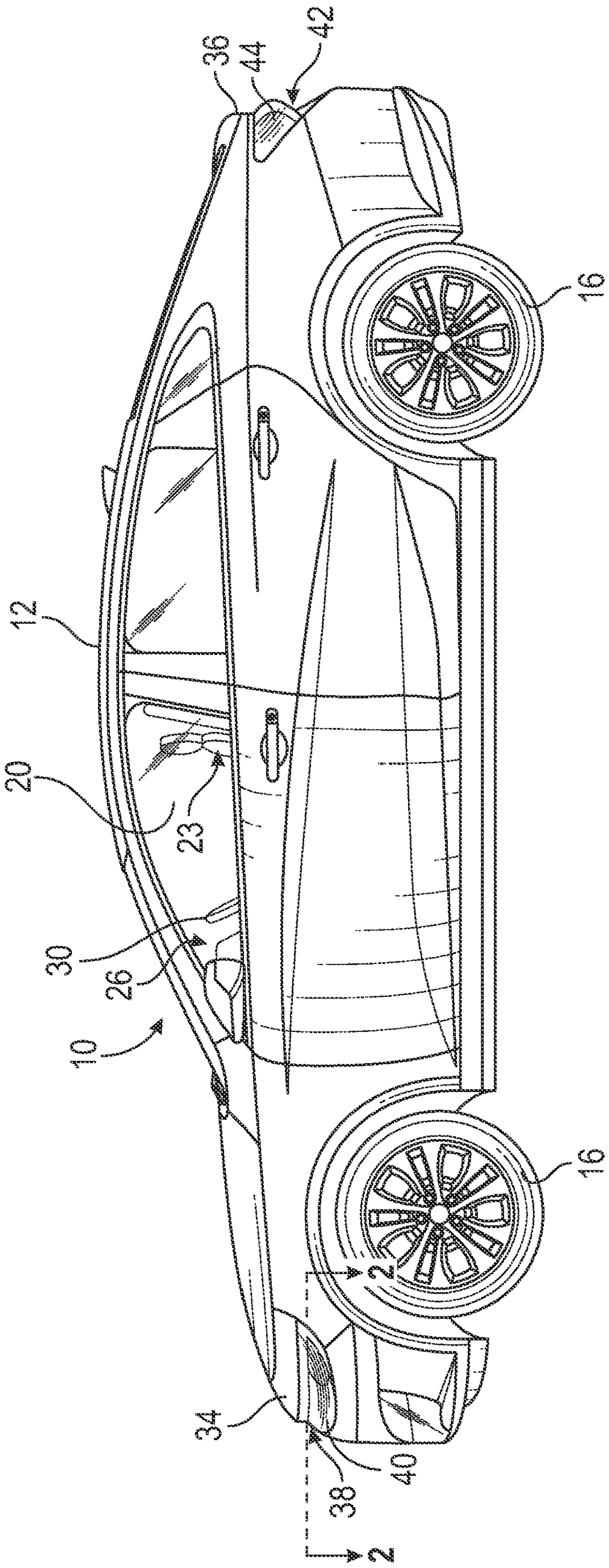
FIG. 1 is a left side view of a vehicle including a light member having double sided light manipulating elements, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least two of the plurality of wheels 16 are steerable. Body 12 defines, in part, a passenger compartment 20 having seats, one of which is indicated at 23, positioned behind a dashboard 26. A steering control system 30 is arranged between seats 23 and dashboard 26. Body 12 includes a forwardly facing surface 34 and a rearwardly facing surface 36. A first light member 38 shown in the form of a headlight 40 is mounted to forwardly facing surface 34 and a second light member 42 shown in the form of a tail light 44 is mounted to rearwardly facing surface 36.

Figure 2:
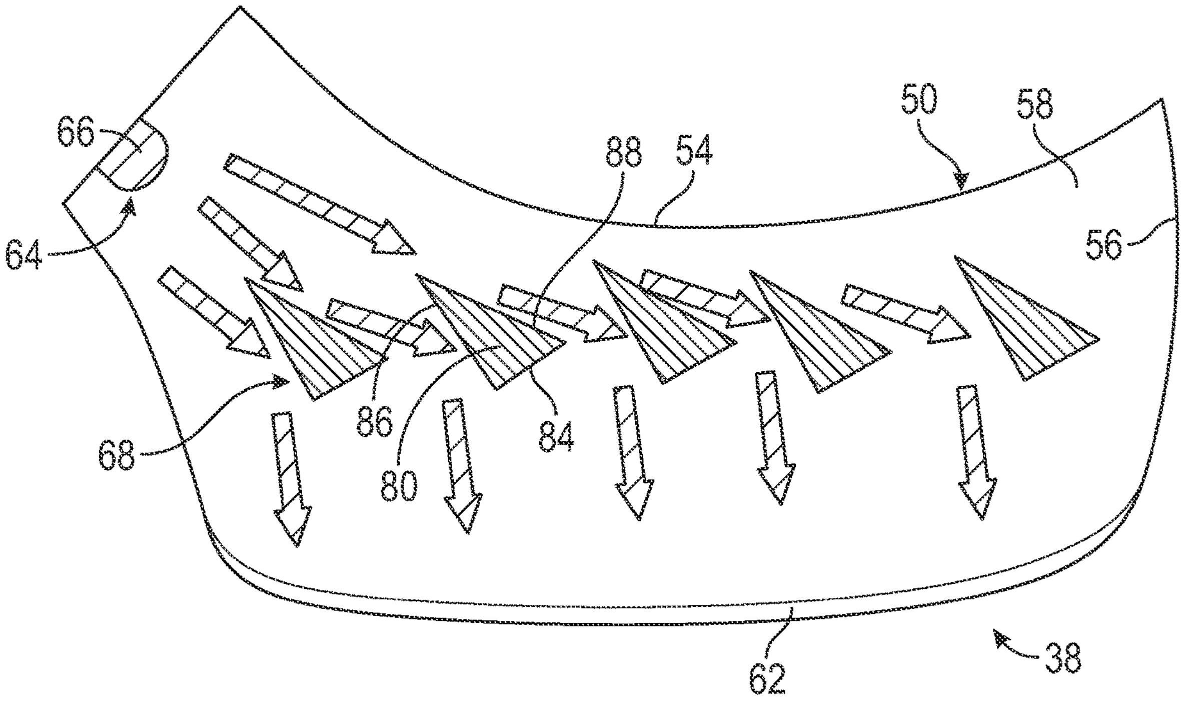
FIG. 2 is a schematic view of the light member having double sided light manipulating elements, in accordance with a non-limiting example.

Reference will now follow to FIG. 2 in describing first light member 38 with the understanding that second light member 42 may include similar structure. First light member 38 includes a housing 50 having an outer surface 54 and an inner surface 56 that defines an interior 58. Housing 50 includes a lens 62 that forms part of inner surface 56 and outer surface 54. First light member 38 includes a light source 64 shown in the form of a single lamp 66 in accordance with a non-limiting example. Light source 64 directs beams of light onto and through a plurality of light manipulating elements 68 that collimate and pass the beams of light through lens 62.

In a non-limiting example, each of the plurality of light manipulating elements 68 includes a body 80 formed from an opaque material. Body 80 includes three sides defined by a base surface 84, a first side surface 86 and a second side surface 88. First and second side surfaces 86 and 88 are light manipulating surfaces that extend from base surface 84 and join at a point (not separately labeled) forming a generally triangular cross-section for body 80. In a non-limiting example, first side surface 86 includes a first reflectance and second side surface includes a second reflectance. In a non-limiting example, the first reflectance and the second reflectance are substantially similar. While shown and described as having three surfaces, body 80 may include as few as two surfaces so long as both surfaces are designed to manipulate light. Body 80 may also be formed to include more than three surfaces.

Figure 3:
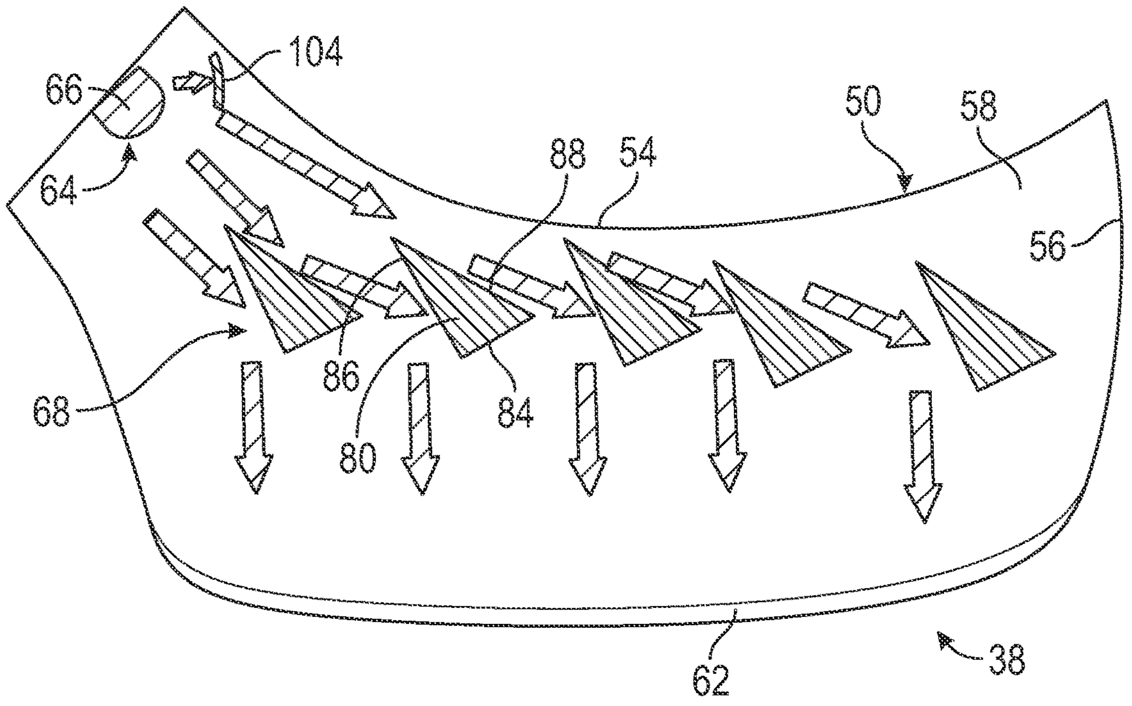
FIG. 3 is a schematic view of the light member including double sided light manipulating elements and a blocking member, in accordance with a non-limiting example.

First side surface 86 extends at a first angle relative to light source 64 and second side surface 88 extends at a second angle relative to light source 64. In a non-limiting example, the first angle and the second angle relative to light source 64 are different. The different angles take advantage of both surfaces being reflective. In a non-limiting example, the first angle directs light rays from first side surface 86 through lens 62. The second angle is arranged to direct light rays from second side surface 88 to a first side surface of an adjacent one of the plurality of light manipulating elements 68 and then through lens 62. The added reflective surface reduces optical interferences by directing more of the light from light source 64 through the plurality of light manipulating elements 68 and then through lens 62. In order to further enhance lighting efficiency, a blocking member 104 (FIG. 3) may be arranged adjacent to light source 64. Blocking member 104 blocks and/or redirects stray light rays from light source 64. The stray light rays may be blocked from interfering with collimated light passing through lens 62 or may pass through lens 62 as collimated light.

Figure 4:
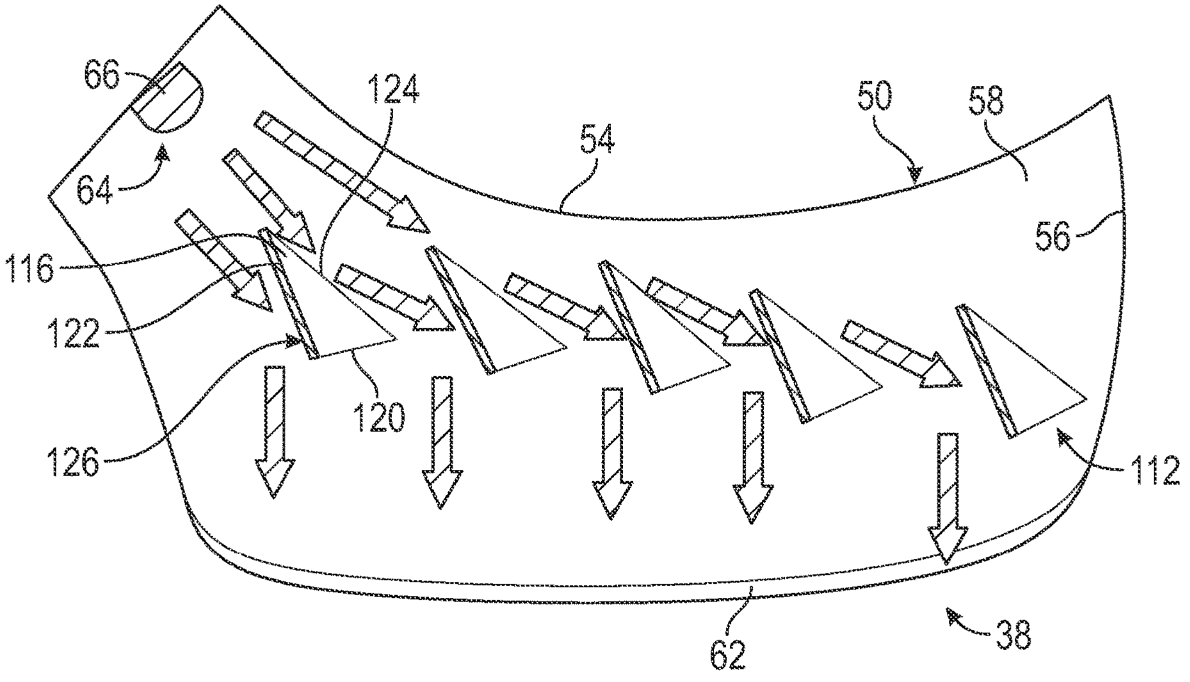
FIG. 4 is a schematic view of the light member having double sided light manipulating elements, in accordance with another non-limiting example.

Reference will now follow to FIG. 4 in describing a plurality of light manipulating elements 112 in accordance with another non-limiting example. Each of the plurality of light manipulating elements 112 includes a body 116 formed from a clear material. Body 116 includes three sides defined by a base surface 120, a first side surface 122 and a second side surface 124. First and second side surfaces 122 and 124 are light manipulating surfaces that extend from base surface 120 and join at a point (not separately labeled) forming a generally triangular cross-section for body 116. In a non-limiting example, a reflective element 126 is mounted to first side surface 122. Reflective element 126 defines or embodies the first reflectance and second side surface 124 includes the second reflectance. In a non-limiting example, the first reflectance is greater than the second reflectance.

In a manner similar to that discussed herein, first side surface 122 extends at a first angle relative to light source 64 and second side surface 124 extends at a second angle relative to light source 64. In a non-limiting example, the first angle and the second angle relative to light source 64 are different. The different angles take advantage of the different reflectance of the two surfaces. In a non-limiting example, the first angle directs light rays from first side surface 122 through lens 62. Thus, the increased reflectance provided by reflective element 126 increases lighting efficiency. The second angle is arranged to direct light rays from second side surface 124 to a first side surface of an adjacent one of the plurality of light manipulating elements 112 and then through lens 62. The added reflective surface reduces optical interferences by directing more of the light from light source 64 through the plurality of light manipulating elements 112 and then through lens 62.

Figure 5:
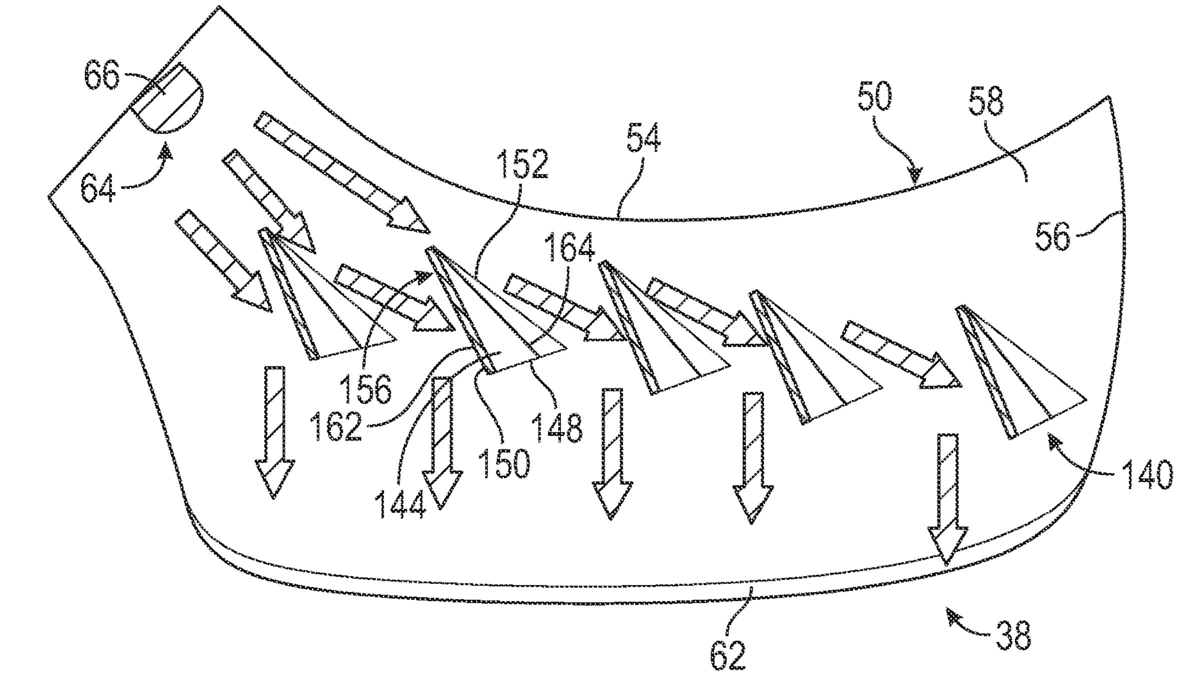
FIG. 5 is a schematic view of the light member having double sided light manipulating elements, in accordance with yet another non-limiting example.

Reference will now follow to FIG. 5 in describing a plurality of light manipulating elements 140 in accordance with yet another non-limiting example. Each of the plurality of light manipulating elements 140 includes a body 144 formed from a clear material. Body 144 includes three sides defined by a base surface 148, a first side surface 150 and a second side surface 152. First and second side surfaces 150 and 152 are light manipulating surfaces that extend from base surface 148 and join at a point (not separately labeled) forming a generally triangular cross-section for body 144. In a non-limiting example, a first reflective element 162 is mounted to first side surface 150. First reflective element 162 defines the first reflectance. A second reflective element 164 is arranged within body 144 spaced from first side surface 150 and second side surface 152. Second reflective element 164 together with second side surface 152 define the second reflectance. In a non-limiting example, the first reflectance is greater than the second reflectance.

In a manner similar to that discussed herein, first side surface 150 extends at a first angle relative to light source 64 and second side surface 152 extends at a second angle relative to light source 64. Second reflective element 164 also extends at the second angle. However, it should be understood that the angle of the second reflective element 164 may vary depending upon desired light output characteristics. The different angles take advantage of the different reflectance of the two surfaces. In a non-limiting example, the first angle directs light rays from first side surface 150 through lens 62. Thus, the increased reflectance of provided by reflective element 162 increases lighting efficiency. The second angle is arranged to direct light rays from second side surface 152 to a first side surface of an adjacent one of the plurality of light manipulating elements 140 and then through lens 62. The added reflective surface reduces optical interferences by directing more of the light from light source 64 through the plurality of light manipulating elements 140 and then through lens 62.

Figure 6:
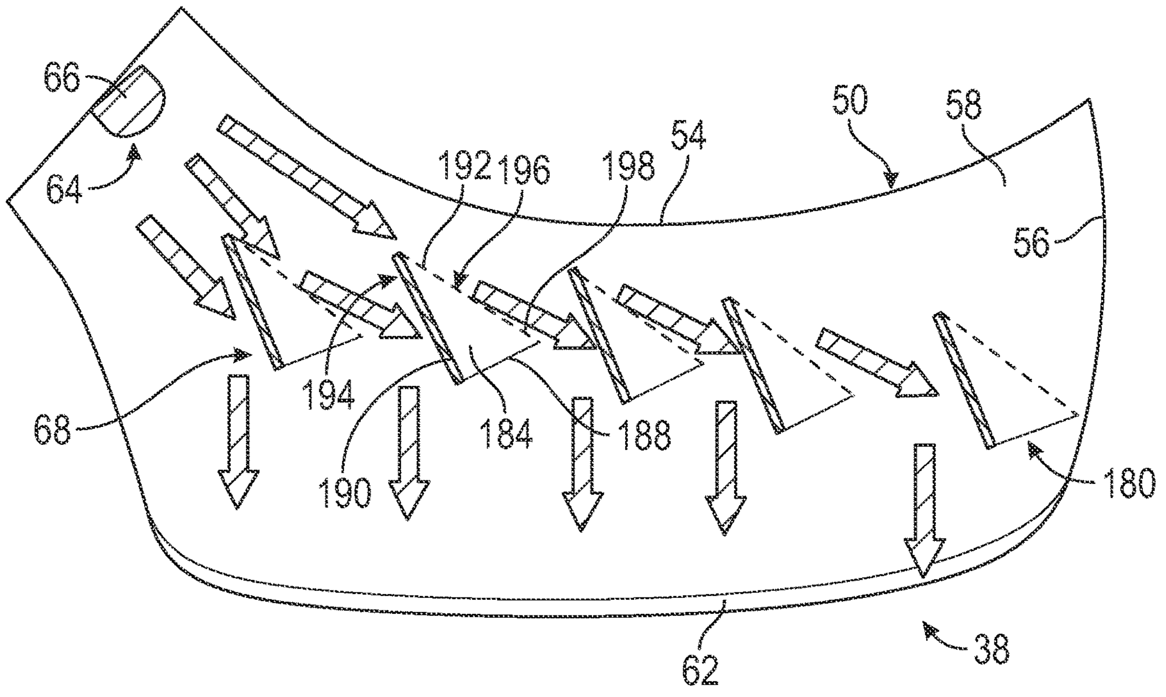
FIG. 6 is a schematic view of the light member having double sided light manipulating elements, in accordance with still yet another non-limiting example.

Reference will now follow to FIG. 6 in describing a plurality of light manipulating elements 180 in accordance with yet another non-limiting example. Each of the plurality of light manipulating elements 180 includes a body 184 formed from a clear material. Body 184 includes three sides defined by a base surface 188, a first side surface 190 and a second side surface 192. First and second side surfaces 190 and 192 are light manipulating surfaces that extend from base surface 188 and join at a point (not separately labeled) forming a generally triangular cross-section for body 184. In a non-limiting example, a first reflective element 194 is mounted to first side surface 190. First reflective element 194 defines the first reflectance. A second reflective element 196 is mounted on second side surface 192. Second reflective element 196 includes a plurality of reflective sections, one of which is indicated at 198 spaced one from another, forming a pattern on second side surface 192. The plurality of reflective sections 198 define the second reflectance. In a non-limiting example, the first reflectance is greater than the second reflectance.

In a manner similar to that discussed herein, first side surface 190 extends at a first angle relative to light source 64 and second side surface 192 extends at a second angle relative to light source 64. The different angles take advantage of the difference reflectance of the two surfaces. In a non-limiting example, the first angle directs light rays from first side surface 190 through lens 62. Thus, the increased reflectance provided by first reflective element 194 increases lighting efficiency. The second angle is arranged to direct light rays from second side surface 192 to a first side surface of an adjacent one of the plurality of light manipulating elements 180 and then through lens 62. The added reflective surface reduces optical interferences by directing more of the light from light source 64 through the plurality of light manipulating elements 180 and then through lens 62.

Figure 7:
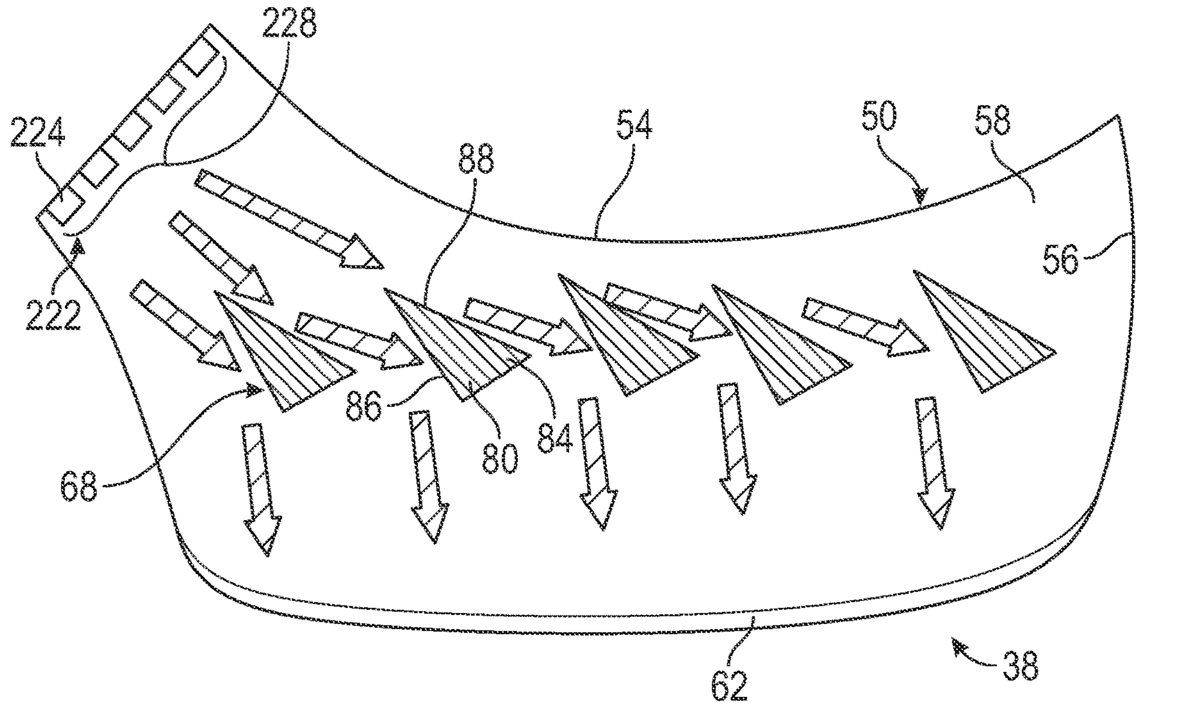
FIG. 7 is a schematic view of the light member having a light source directed at the double sided light manipulating elements, in accordance with a non-limiting example.

FIG. 7 depicts a light source 222 arranged in housing 50 formed from a plurality of light emitting diodes (LEDs) 224. LEDs 224 are shown arranged in a linear array 228. Of course, the particular shape of the array may vary depending on housing shape, desired lighting characteristics, and other factors. Regardless of the type of light source being used, the double light manipulating surfaces on each of the plurality of reflective elements provides a unique lighting appearance having a desired photometric pattern. Further, by using one light manipulating side surface to direct light directly through the lens and a second light manipulating side surface to direct light toward another reflector element, the light member will possess a required photometric output while also collimating light beams that might otherwise have created interferences.

Figure 8:
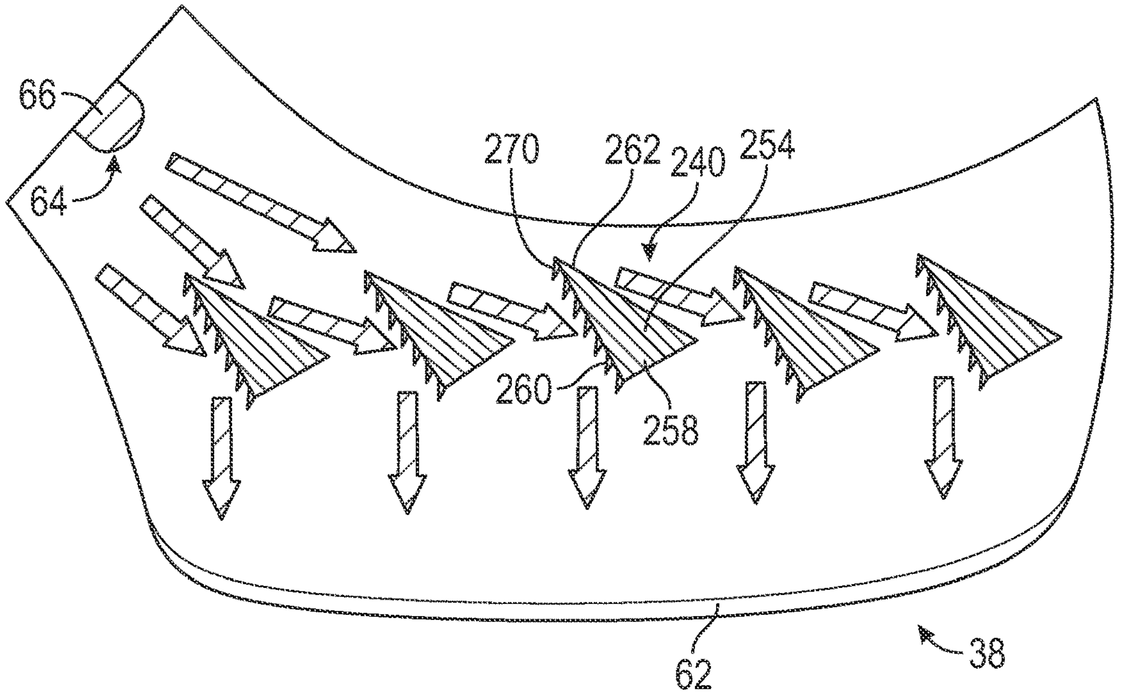
FIG. 8 is a schematic view of the light member having hybrid light manipulating elements, in accordance with yet another non-limiting example.

Reference will follow to FIG. 8, in describing a plurality of light manipulating elements 240 in accordance with yet another non-limiting example. Each of the plurality of light manipulating elements 240 includes a body 254 formed from a clear material. Body 254 includes three sides defined by a base surface 258, a first side surface 260 and a second side surface 262. First and second side surfaces 260 and 262 are light manipulating surfaces that extend from base surface 258 and join at a point (not separately labeled) forming a generally triangular cross-section for body 254. In the non-limiting example shown, first side surface 260 includes a plurality of refractive elements 270 and second side surface 262 is reflective. Thus, in the non-limiting example, shown, each of the plurality of light manipulating elements 240 is a hybrid element that both refracts and reflects light through lens 62.

Figure 9:
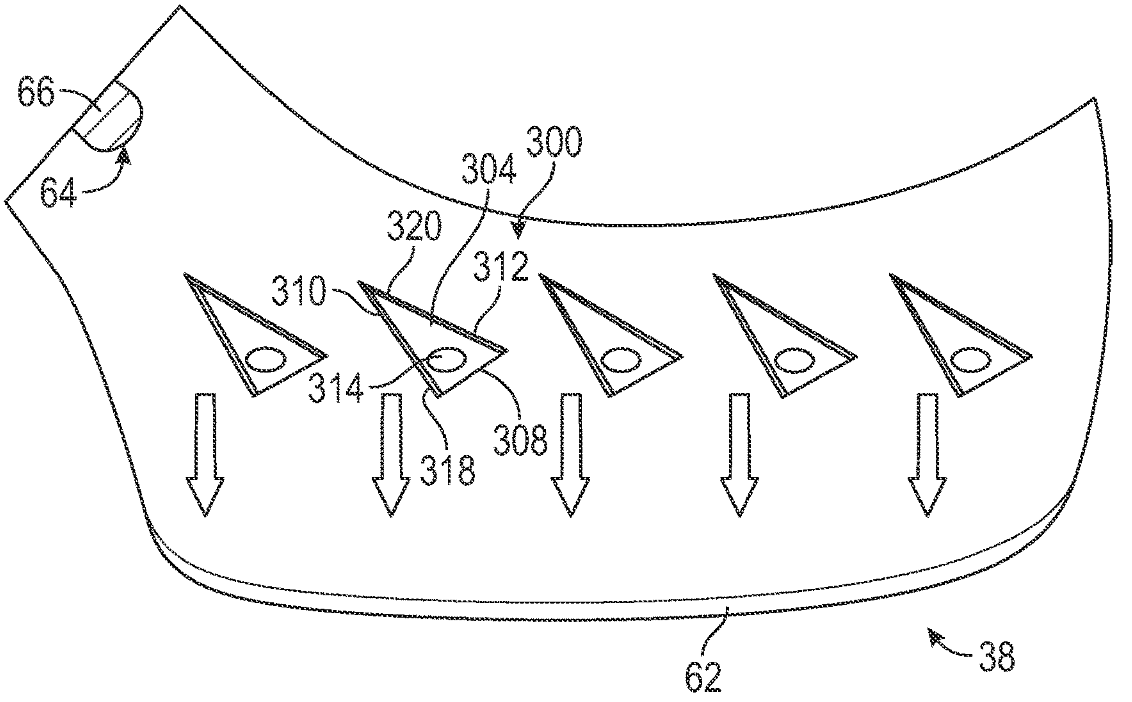
FIG. 9 is a schematic view of the light member having double sided light manipulating elements including embedded light emitting diodes (LEDs), in accordance with yet another non-limiting example.

Reference will follow to FIG. 9, in describing a plurality of light manipulating elements 300 in accordance with still yet another non-limiting example. Each of the plurality of light manipulating elements 300 includes a body 304 formed from an opaque material. Body 304 includes three sides defined by a base surface 308, a first side surface 310 and a second side surface 312. First and second side surfaces 310 and 312 are light manipulating surfaces that extend from base surface 308 and join at a point (not separately labeled) forming a generally triangular cross-section for body 254. In the non-limiting example shown, an LED 314 is arranged within body 304 of each of the plurality of light manipulating elements 300. In addition, first side surface 310 may include a first partially transmissive metallization or patterned reflective surface 318. Likewise, second side surface 312 may include a second partially transmissive metallization or patterned reflective surface 320. Each partially transmissive metallization or patterned reflective surface 318 and 320 manipulates light passing from LED 314 through lens 62.

In a non-limiting example, the dual light manipulating surfaces described as being in the form of reflective surfaces for each light manipulating element should enhance lighting efficiency by 30% or more thereby reducing power consumption while still providing desired lighting output. It should be understood that while the light manipulating surfaces are described as being reflective, refractive surfaces may also be used to manipulate the light passing through lens 62 in order to achieve the desired lighting efficiency enhancements. While shown as being employed in connection with a vehicle, the light member in accordance with non-limiting examples may be used in a wide array of applications.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A light member comprising:
- a housing including an outer surface and an inner surface, a portion of the outer surface including a lens;
- a light source mounted in the housing, the light source being directed toward the lens; and
- a plurality of light manipulating elements arranged in the housing between the light source and the lens, each of the plurality of light manipulating elements including a body having a first side surface and a second side surface, each of the first side surface and the second side surface being a light manipulating surface, wherein the first side surface includes a first reflectance and extends at a first angle relative to the light source and the second side surface includes a second reflectance and extends at a second angle relative to the light source and at a non-zero angle relative to the first side surface,
- wherein at least one of the light manipulating surfaces includes a plurality of refractive elements.

2. The light member according to claim 1, wherein the first angle is arranged to direct light from the light source through the lens and the second angle is arranged to direct light rays from the light source toward the first side surface of an adjacent one of the plurality of light manipulating elements.

3. The light member according to claim 2, wherein the first reflectance is greater than the second reflectance.

4. The light member according to claim 1, wherein the body is formed from a clear material.

5. The light member according to claim 4, further comprising a reflective element mounted to the first side surface, the reflective element establishing the first reflectance.

6. The light member according to claim 5, further comprising another reflective element extending through the body between the first side surface and the second side surface.

7. The light member according to claim 5, further comprising another reflective element mounted to the second side surface, the another reflective element including a pattern of reflective sections.

8. The light member according to claim 1, wherein the light source includes a plurality of light emitting diodes (LED's).

9. The light member according to claim 1, wherein the lens includes a central light emitting axis, the light source being off-set relative to the central light emitting axis.

10. A vehicle comprising:
- a vehicle body defining a passenger compartment, the vehicle body having a forwardly facing surface and a rearwardly facing surface; and
- a light member mounted to one of the forwardly facing surface and the rearwardly facing surface, the light member comprising:
  - a housing including an outer surface and an inner surface, a portion of the outer surface including a lens;
  - a light source mounted in the housing, the light source being directed toward the lens; and
  - a plurality of light manipulating elements arranged in the housing between the light source and the lens, each of the plurality of light manipulating elements including a body having a first side surface and a second side surface, each of the first side surface and the second side surface being a light manipulating surface, wherein the first side surface includes a first reflectance and extends at a first angle relative to the light source and the second side surface includes a second reflectance and extends at a second angle relative to the light source and at a non-zero angle relative to the first side surface;
- wherein at least one of the light manipulating surfaces includes a plurality of refractive elements.

11. The vehicle according to claim 10, wherein the first angle is arranged to direct light from the light source through the lens and the second angle is arranged to direct light rays from the light source toward the first side surface of an adjacent one of the plurality of light manipulating elements.

12. The vehicle according to claim 11, wherein the first reflectance is greater than the second reflectance.

13. The vehicle according to claim 10, wherein the body is formed from a clear material.

14. The vehicle according to claim 13, further comprising a reflective element mounted to the first side surface, the reflective element establishing the first reflectance.

15. The vehicle according to claim 14, further comprising another reflective element extending through the body between the first side surface and the second side surface.

16. The vehicle according to claim 14, further comprising another reflective element mounted to the second side surface, the another reflective element including a pattern of reflective sections.

17. The vehicle according to claim 10, wherein the light source includes a plurality of light emitting diodes (LED's).

18. The vehicle according to claim 10, wherein the lens includes a central light emitting axis, the light source being off-set relative to the central light emitting axis.

* * * * *